(12) United States Patent  (10) Patent No.: US 8,169,573 B2
Nam  (45) Date of Patent: May 1, 2012

(54) LIQUID CRYSTAL DISPLAY DEVICE USING A PHASE-DIFFERENCE FILM AND IN-PLANE SWITCHING MODE LIQUID CRYSTAL DISPLAY DEVICE USING A PHASE-DIFFERENCE FILM

(75) Inventor: Mi Sook Nam, Anyang-si (KR)

(73) Assignee: LG Display Co., Ltd., Seoul (KR)

( * ) Notice: Subject to any disclaimer, the term of this patent is extended or adjusted under 35 U.S.C. 154(b) by 593 days.

(21) Appl. No.: 11/442,630

(22) Filed: May 30, 2006

(65) Prior Publication Data

US 2006/0285039 A1    Dec. 21, 2006

(30) Foreign Application Priority Data

May 30, 2005  (KR) .......................... 10-2005-0045576

(51) Int. Cl.
  *G02F 1/1335*    (2006.01)
  *G02F 1/1343*    (2006.01)
(52) U.S. Cl. ........ 349/119; 349/118; 349/120; 349/121; 349/141
(58) Field of Classification Search .......... 349/117–121, 349/141
  See application file for complete search history.

(56) References Cited

U.S. PATENT DOCUMENTS

| 4,852,976 | A  | * | 8/1989  | Suzuki .......................... 349/119 |
| 5,619,352 | A  | * | 4/1997  | Koch et al. ....................... 349/89 |
| 5,990,997 | A  | * | 11/1999 | Jones et al. .................... 349/120 |
| 6,778,245 | B2 | * | 8/2004  | Hiroshi ......................... 349/141 |
| 6,831,722 | B2 | * | 12/2004 | Ishikawa et al. ............... 349/117 |
| 6,903,789 | B1 | * | 6/2005  | Cutler et al. .................. 349/119 |
| 7,227,602 | B2 | * | 6/2007  | Jeon et al. ..................... 349/119 |
| 7,359,018 | B2 | * | 4/2008  | Kashima ....................... 349/119 |
| 2005/0151903 | A1 | * | 7/2005  | Okumura ...................... 349/117 |

FOREIGN PATENT DOCUMENTS

KR   10-2002-0041433  A    6/2002

* cited by examiner

*Primary Examiner* — Mark Robinson
*Assistant Examiner* — Paisley L Arendt
(74) *Attorney, Agent, or Firm* — Morgan, Lewis & Bockius LLP

(57) ABSTRACT

A liquid crystal display (LCD) device is provided. The LCD device includes an LCD panel having a first liquid crystal layer therein; a first polarizing sheet; and a first phase-difference compensation portion disposed adjacent a first surface of the LCD panel between the LCD panel and the first polarizing sheet. The first phase-difference compensation portion includes a plurality of phase-difference films having at least second and third liquid crystal layers with tilt angles that are different.

4 Claims, 9 Drawing Sheets

| | | |
|---|---|---|
| A-plate | | $nx > ny = nz$ |
| negative C-plate | | $nz < nx = ny$ |
| positive C-plate | | $nx = ny = nz$ |
| biaxial film | | $nx > ny > nz$ |
| discotic film | | $nx > ny > nz$ $\theta > 0°$ |

LIQUID CRYSTAL DISPLAY DEVICE USING A PHASE-DIFFERENCE FILM AND IN-PLANE SWITCHING MODE LIQUID CRYSTAL DISPLAY DEVICE USING A PHASE-DIFFERENCE FILM

This application claims the benefit of the Korean Patent Application No. P2005-0045576, filed on May 30, 2005, which is hereby incorporated by reference as if fully set forth herein.

BACKGROUND OF THE INVENTION

1. Field of the Invention

The present invention relates to a liquid crystal display (LCD) device, and more particularly, an LCD device using a phase-difference film to realize a wide viewing angle.

2. Discussion of the Related Art

Among various ultra-thin flat type display devices having a thickness of several centimeters, the liquid crystal display (LCD) device is widely used for notebook computers, monitors, aircrafts, etc. Generally, an LCD device includes lower and upper substrates facing each other, and a liquid crystal layer disposed between the lower and upper substrates. As a voltage is applied to the LCD device, the light transmittance of the LCD device is controlled according to an alignment of the liquid crystal layer, thereby displaying images.

Figure 1A:
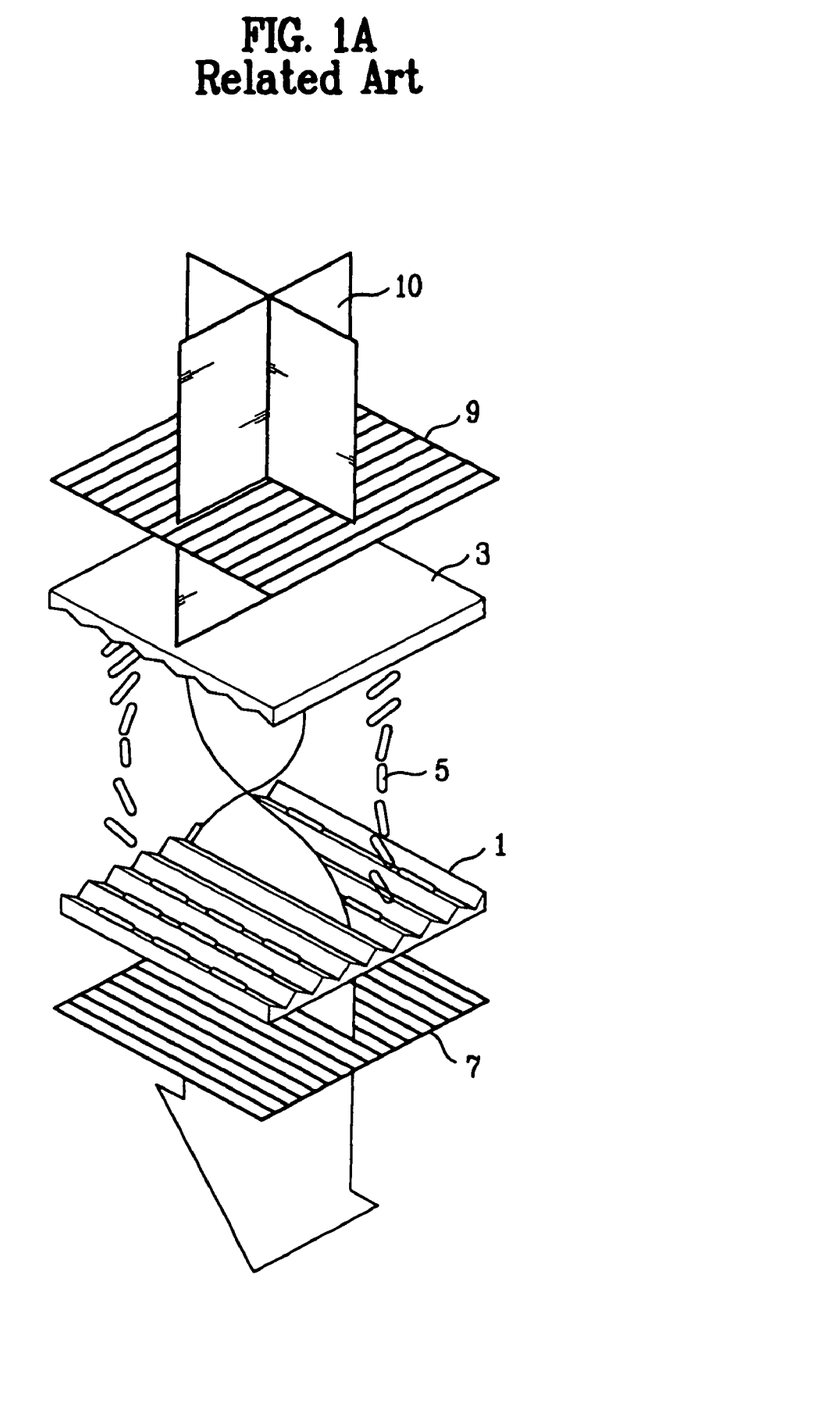
Figure 1B:
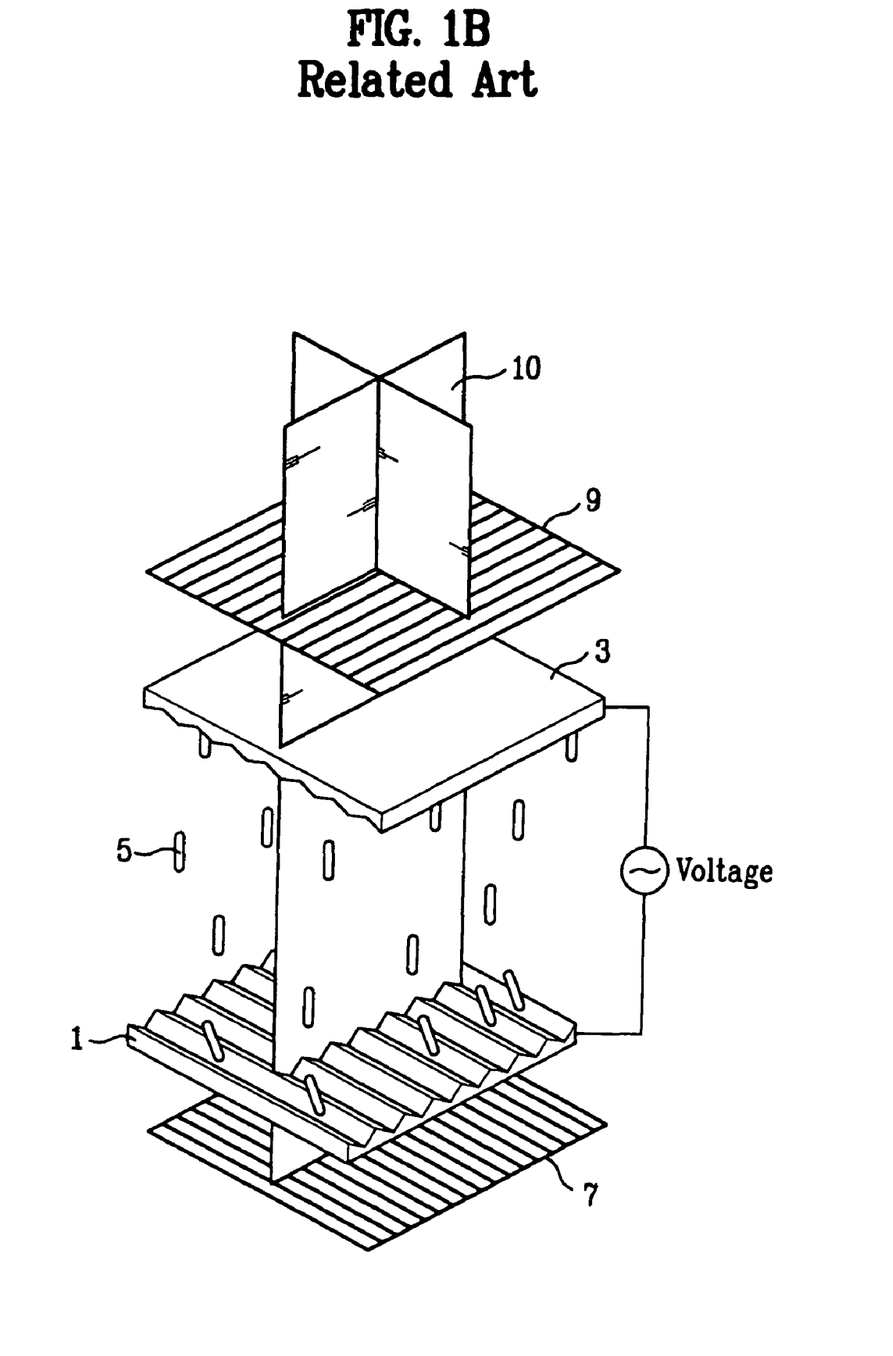

Hereinafter, a related art LCD device will be explained with reference to FIGS. 1A and 1B. FIGS. 1A and 1B are cross sectional views of a related art twisted nematic (TN) mode LCD device, wherein FIG. 1A illustrates the TN mode LCD device at the time of no voltage application, and FIG. 1B illustrates the TN mode LCD device at the time of voltage application.

The LCD device includes a first substrate 1, a second substrate 3, and a liquid crystal layer 5 formed between the first and second substrates 1 and 3. Then, a first alignment layer of a first direction is coated on the first substrate 1, and a second alignment layer of a second direction is coated on the second substrate 3, wherein the first direction of the first alignment layer is perpendicular to the second direction of the second alignment layer. Next, a first polarizer 7 having a transmission axis in the same direction as the first alignment layer is formed on an outer surface of the first substrate 1. Also, a second polarizer 9 having a transmission axis in the same direction as the second alignment layer is formed on an outer surface of the second substrate 3.

In the case of FIG. 1A, when the voltage is not applied to the LCD device, liquid crystal molecules included in the liquid crystal layer 5 are twisted at 90° between the first and second alignment layers. In this case, as an unpolarized light 10 is incident on the second polarizer 9, the unpolarized light is polarized to a linearly polarized light so that the linearly polarized light is transmitted through the liquid crystal layer 5. Like the twisted liquid crystal molecules, the polarization of the light is twisted by 90° so that light is transmitted through the first polarizer 7 and the image is displayed in a white state.

In the case of FIG. 1B, when the voltage is applied to the LCD device, the liquid crystal molecules included in the liquid crystal layer 5 are aligned in the vertical direction between the first and second substrates 1 and 3 due to the electric field generated. At this time, as an unpolarized light 10 is incident on the second polarizer 9, the unpolarized light is polarized to a linearly polarized light so that the linearly polarized light is transmitted through the liquid crystal layer 5. In this case, as the polarization direction of light is not twisted, the light is blocked by the first polarizer 7, thereby displaying a black state.

According to the driving method of FIGS. 1A and 1B, the TN mode LCD device displays the images. However, the TN mode LCD device has a disadvantage of a narrow viewing angle.

Figure 2A:
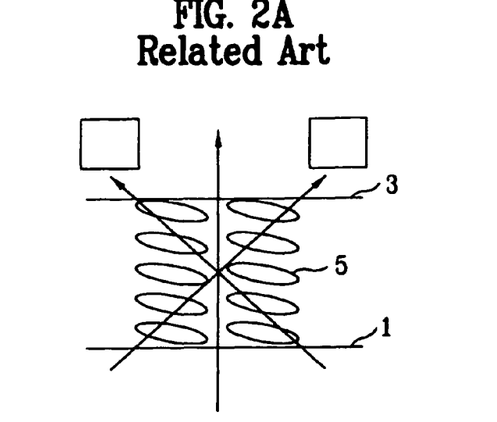
Figure 2B:
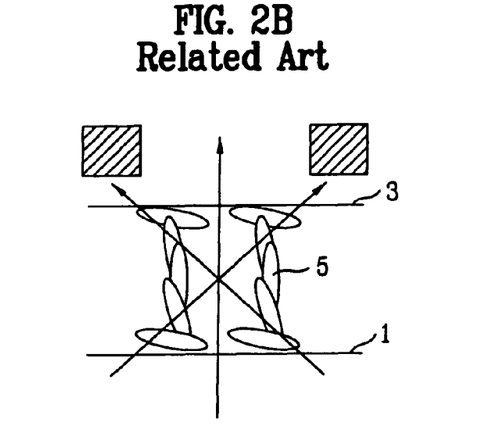
Figure 2C:
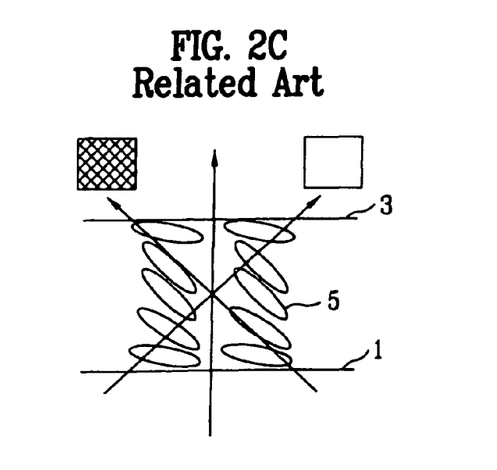

FIGS. 2A to 2C are perspective views for explaining a problem of the TN mode LCD device, wherein FIG. 2A illustrates a white display state at the time of no voltage application, FIG. 2B illustrates a black display state of full-voltage application, and FIG. 2C illustrates an intermediate display state at the time of intermediate-level voltage application.

In FIG. 2A, when the voltage is not applied to the LCD device, the liquid crystal molecules 5 are twisted, and the incident light displays the white state in all directions. In FIG. 2B, when the full-voltage is applied to the LCD device, the liquid crystal molecules 5 are aligned in the vertical direction by the electric field so that the incident light displays the black state. In FIG. 2C, when the intermediate-level voltage is applied, the liquid crystal molecules 5 are aligned in a tilt direction so that the display state is changed according to the direction of incident light. That is, in the case of the leftward-tilt light, which is incident from a lower right side to an upper left side, the polarization direction is not changed, thereby displaying the black state. Meanwhile, in the case of the rightward-tilt light, which is incident from a lower left side to an upper right side, the polarization direction is changed, thereby displaying the white state. Accordingly, the TN mode LCD device has the display state changed according to the light incidence direction so that the TN mode LCD device has the disadvantage of narrow viewing angle.

To overcome the problem of narrow viewing angle, various methods have been proposed. For example, an in-plane switching (IPS) mode using a transverse electric field parallel to the substrates, a vertical alignment (VA) mode using a vertical alignment layer, an electrically controlled birefringence (ECB) mode, etc. have been proposed. In addition, there is a multi-domain method which uses the mean value of alignment of liquid crystal molecules by dividing a domain, and a phase-difference compensation method which uses a phase-difference film to change a phase-difference according to a change of viewing angle. Among the above methods for overcoming the problem of narrow viewing angle, the phase-difference compensation method using a phase-difference film will be explained with reference to FIG. 3.

Figure 3:
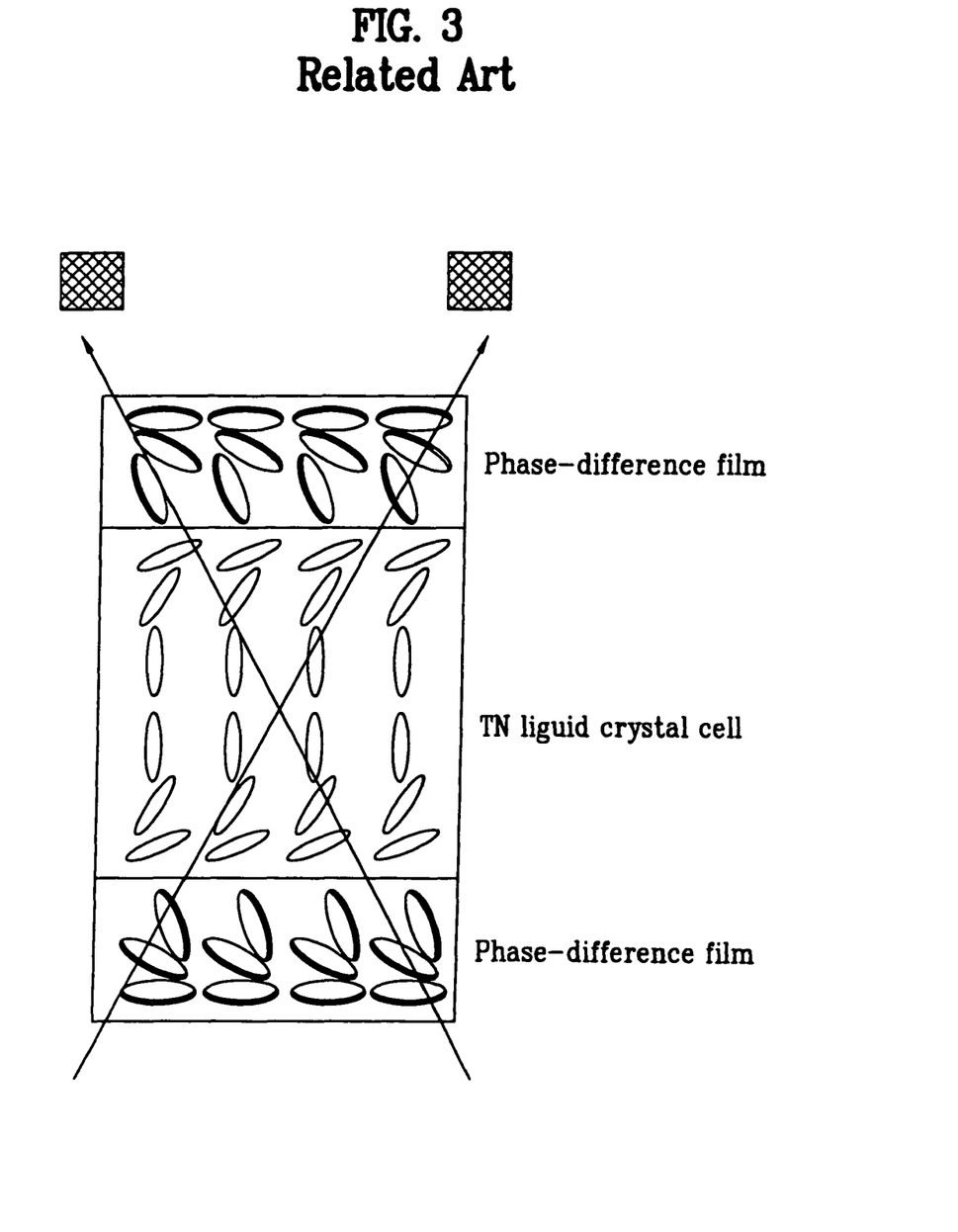
FIG. 3 illustrates a method for realizing a wide viewing angle using a phase-difference film according to the related art.

In the phase-difference compensation method of FIG. 3, a phase-difference film is formed above or below of a liquid crystal cell having liquid crystal molecules so that the same display state is obtained without regard to the light incidence direction.

The use of the phase-difference film to achieve a wide viewing angle is not limited to the TN mode. That is, the phase-difference film may be applied to the IPS mode or the ECB mode. To overcome the problem of the TN mode LCD device, the IPS mode or the ECB mode has been proposed. However, even in case of the IPS and ECB modes, it is difficult to completely overcome the problem of viewing angle. That is, the appropriate phase-difference film is applied based on the mode to improve the viewing angle.

The method using the phase-difference film is changed in design in consideration of the alignment state of liquid crystal based on the mode. Accordingly, the phase-difference film is formed of a material which is suitable for changing the design of phase-difference film. That is, a phase difference ($\Delta nd$) is designed by chaining a refractive anisotropy ($\Delta n$) of liquid crystal layer and a thickness (d) of liquid crystal layer, thereby optimizing the viewing angle according to the mode.

However, if fabricating the phase-difference film by the liquid crystal, the phase difference (Δnd) obtained by changing the refractive anisotropy (Δn) of liquid crystal layer and the thickness (d) of liquid crystal layer can compensate for the viewing angle. In the related art, there is no consideration to a tilt angle of liquid crystal layer. Thus, a light leakage may be caused due to the tilt angle of liquid crystal. If fabricating the film using the liquid crystal, the alignment layer must be provided for aligning the liquid crystal molecules. That is, the tilt angle is generated in the liquid crystal layer due to the alignment layer. When fabricating the phase-difference film using the liquid crystal according to the related art, the refractive anisotropy (Δn) of liquid crystal layer and the thickness (d) of liquid crystal layer are considered. That is, there is no consideration given to the tilt angle generated in the liquid crystal in fabricating of the phase-difference film such that the problem of light leakage is generated.

SUMMARY OF THE INVENTION

Accordingly, the present invention is directed to an LCD device that substantially obviates one or more problems due to limitations and disadvantages of the related art.

An object of the present invention is to provide an LCD device to realize a wide viewing angle and to prevent light leakage by controlling a tilt angle.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display (LCD) device comprises an LCD panel having a first liquid crystal layer therein; a first polarizing sheet; and a first phase-difference compensation portion disposed adjacent a first surface of the LCD panel between the LCD panel and the first polarizing sheet, the first phase-difference compensation portion including a plurality of phase-difference films having at least second and third liquid crystal layers with tilt angles that are different.

In another aspect, an in-plane switching (IPS) mode liquid crystal display (LCD) device comprises an LCD panel including a first substrate, a second substrate and a first liquid crystal layer between the first and second substrates, the first liquid crystal layer being driven by a transverse electric field between pixel and common electrodes on one of the first and second substrates of the LCD panel; a first and second polarizing sheets positioned adjacent to the first and second substrates of the LCD panel respectively; and a first first phase-difference compensation portion positioned between the first substrate of the LCD panel and the first polarizing sheet, the phase-difference compensation portion including a plurality of phase-difference films having at least second and third liquid crystal layers with tilt angles that are different from each other.

In another aspect, a liquid crystal display (LCD) device comprises an LCD panel having a first liquid crystal layer therein; a polarizing sheet; and means for providing a phase-difference compensation, the phase-difference compensation means disposed adjacent a first surface of the LCD panel between the LCD panel and the polarizing sheet, wherein the phase-difference compensation means includes a plurality of phase-difference films having at least second and third liquid crystal layers with tilt angles that are different from each other It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 1A and 1B illustrate a cross sectional views of a related art twisted nematic (TN) mode LCD device, wherein FIG. 1A illustrates the TN mode LCD device at the time of no voltage application, and FIG. 1B illustrates the TN mode LCD device at the time of voltage application;

FIGS. 2A and 2C illustrate perspective views for explaining a problem associated with the TN mode LCD device, wherein FIG. 2A illustrates a white display state at the time of no voltage application, FIG. 2B illustrates a black display state of full-voltage application, and FIG. 2C illustrates an intermediate display state at the time of intermediate-level voltage application;

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 4:
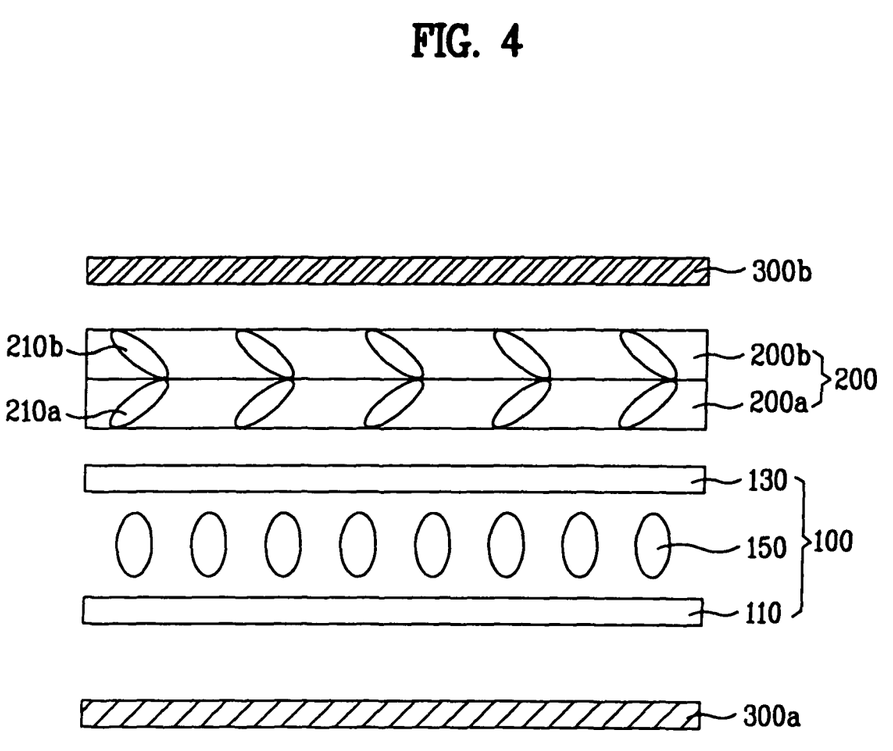
FIG. 4 illustrates a cross sectional view of an LCD device according to an exemplary embodiment of the present invention.

FIG. 4 illustrates a cross sectional view of an LCD device according to a first exemplary embodiment of the present invention. As shown in FIG. 4, the LCD device according to the first embodiment of the present invention is provided with an LCD panel 100, polarizing sheets 300a and 300b formed on outer surfaces of the LCD panel 100, and a phase-difference compensation portion 200 formed between the LCD panel 100 and the polarizing sheet 300b.

The LCD panel 100 comprises a first substrate 110, a second substrate 130, and a first liquid crystal layer 150 formed between the first and second substrates 110 and 130. Although not shown, the first substrate 110 includes gate and data lines crossing each other to define a pixel regions, a thin film transistor (TFT) formed adjacent to each crossing of the gate and data lines, and a pixel electrode in each pixel region connected to the drain electrode of the thin film transistor (TFT) in the pixel region. The second substrate 130 includes a black matrix layer to prevent light leakage, and a color filter layer of red, green and blue patterns formed on the black matrix layer, and a common electrode formed on the color filter layer. An alignment layer for an initial alignment of the first liquid crystal layer 150 is formed on the first and second substrates 110 and 130. The alignment layer is formed by a method, such as, rubbing or photo alignment.

The technical construction of the first and second substrates 110 and 130 is not limited to the foregoing description. That is, the technical construction of the first and second substrates 110 and 130 can be varied based on a mode of the LCD device, for example, TN mode, IPS mode, ECB mode, VA mode, or multi-domain mode.

The polarizing sheets include the first polarizing sheet 300a formed on the outer surface of the first substrate 110, and the second polarizing sheet 300b formed on the outer surface of the second substrate 130. The first and second polarizing sheets 300a and 300b have respective transmission axes for transmitting the predetermined polarized light. Based on the mode of the LCD device, the transmission axis of the first polarizing sheet 300a may have the same direction as the transmission axis of the second polarizing sheet 300b or may have a different direction from the transmission axis of the second polarizing sheet 300b.

The phase-difference compensation portion 200 comprises a plurality of phase-difference films 200a and 200b. In the drawings, the two phase-difference films 200a and 200b are shown. However, other numbers of phase-difference films may be used. For example, three phase-difference films may be formed.

In the drawings, the phase-difference compensation portion 200 is provided between the LCD panel 100 and the second polarizing sheet 300b of the second substrate 130. However, the phase-difference compensation portion 200 may be formed between the LCD panel 100 and the first polarizing sheet 300a of the first substrate 110, or may be formed between the LCD panel 100 and the second polarizing sheet 300b of the second substrate 130 and between the LCD panel 100 and the first polarizing sheet 300a of the first substrate 110. The phase-difference films 200a and 200b include second liquid crystal layers 210a and 210b which have the different tilt angles.

The phase-difference compensation portion 200 is provided to realize a wide viewing angle of the LCD device and to prevent a light leakage of the LCD device. The phase-difference compensation portion 200 will now be explained.

First, the phase-difference compensation portion 200 widens the viewing angle. The design of the LCD panel 100 including the first liquid crystal layer 150 is determined based on the applied mode, for example, TN mode, IPS mode, ECB mode, VA mode or multi-domain mode. Accordingly, an optimal phase retardation value is determined according to the alignment state of the designed first liquid crystal layer 150. Thus, a total $(d_1 \Delta n_1 + d_2 \Delta n_2 + \ldots d_n \Delta n_n$, wherein '$d_n$' is the thickness of the n-th phase-difference film, and $\Delta n_n$ is the refractive anisotropy of the liquid crystal layer for the n-th phase-difference film) of the phase retardation value of the phase-difference film for the phase-difference compensation portion 200 is determined in consideration of the optimal phase retardation value, thereby realizing wide viewing angles.

Also, the phase-difference compensation portion 200 addresses the problem of light leakage. The phase-difference compensation portion 200 is provided with the plurality of phase-difference films 200a and 200b having the difference tilt angles of the second liquid crystal layers 210a and 210b. Even though each tilt angle of the phase-difference films 200a and 200b cannot be controlled, a total tilt angle is controllable.

In particular, in the LCD device according to the present invention, the total tilt angle of the phase-difference compensation portion 200 is set as '0' by adjusting the phase-difference films 200a and 200b, thereby preventing the light leakage. For example, if the second liquid crystal layers 210a and 210b of the same thickness is provided, the tilt angle of the second liquid crystal layer 210a is opposite to the tilt angle of the second liquid crystal layer 210b (for example, +45°, −45°), whereby the total tilt angle is set as '0'.

Figure 7:
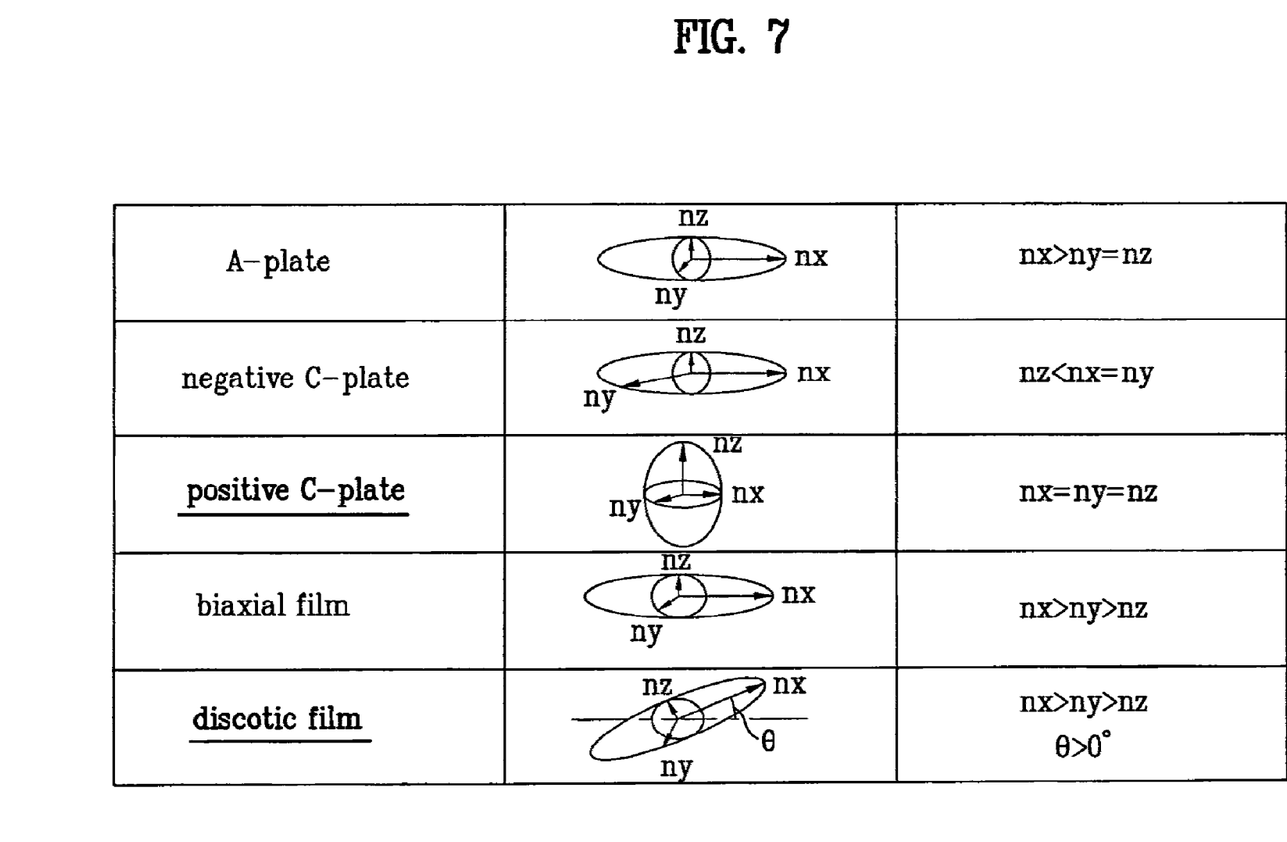
FIG. 7 shows the properties of different exemplary types of films for phase-difference films of a phase difference compensation portion of a LCD device according to the present invention.

Also, even though the tilt angle of the second liquid crystal layer 210a is not opposite to the tilt angle of the second liquid crystal layer 210b, a total tilt angle of '0' can be set by adjusting the thickness of the second liquid crystal layers 210a and 210b. The phase-difference films 200a and 200b applied to the phase-difference compensation portion 200 can be selected from an A-plate, a negative C-plate, a positive C-plate, a biaxial film, and a discotic film, according to the mode of the LCD device. FIG. 7 shows the properties of the different types of films.

The phase-difference films 200a and 200b are formed in steps of coating an alignment material layer on a base film, baking the coated alignment material layer, rubbing the baked alignment material layer, coating a liquid crystal on the rubbed alignment material layer, and curing the coated liquid crystal. The process of curing the coated liquid crystal is performed in a thermal-curing method and/or UV-curing method. Then, additional process may be varied within the scope generally known to those skilled in the art.

Figure 5A:
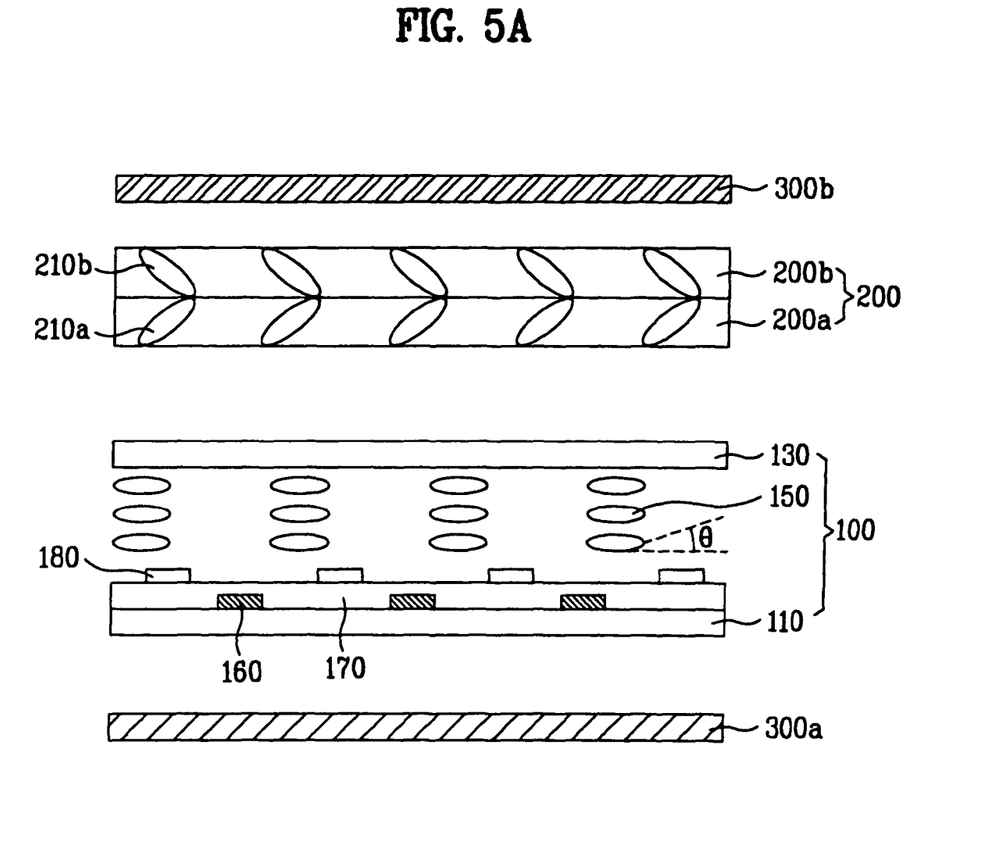
FIGS. 5A and 5B illustrate cross sectional views of an IPS mode LCD device according to an exemplary embodiment of the present invention.
Figure 5B:
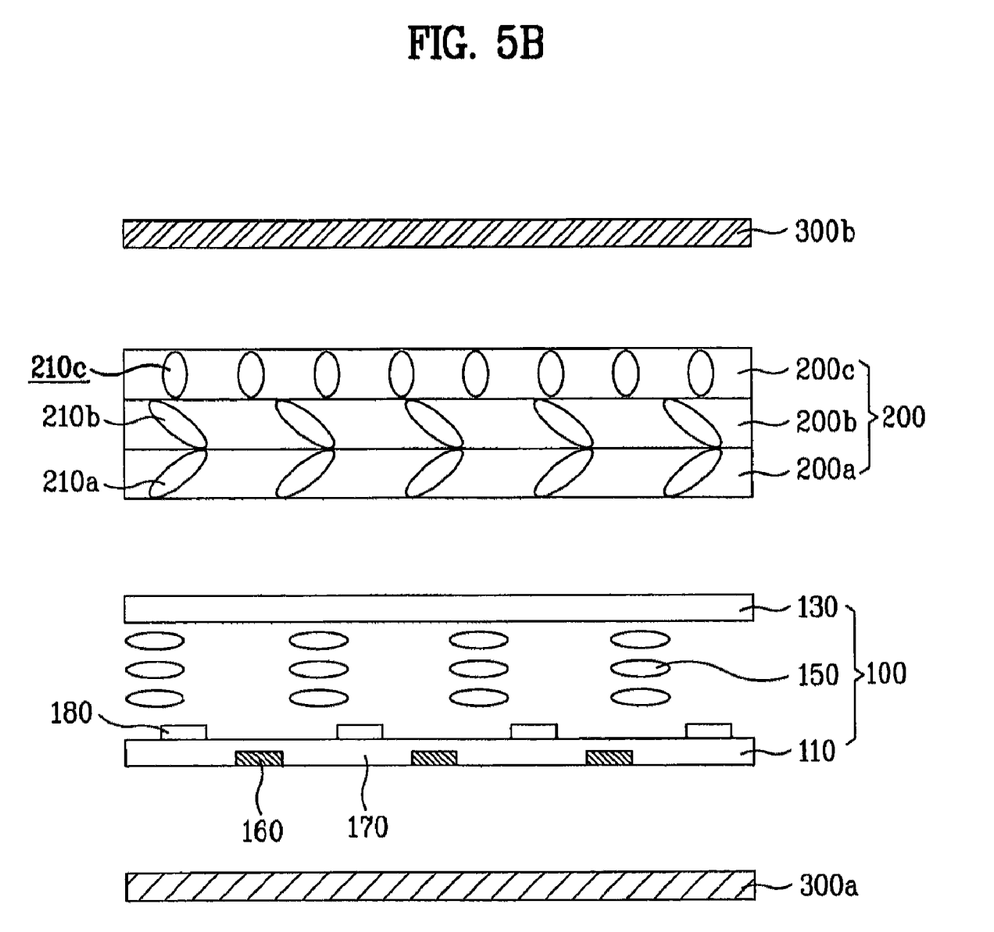

FIGS. 5A and 5B are cross sectional views of an IPS mode LCD device according to a second exemplary embodiment of the present invention.

As shown in FIGS. 5A and 5B, the IPS mode LCD device according to the second exemplary embodiment of the present invention is provided with an LCD panel 100, polarizing sheets 300a and 300b formed on outer surfaces of the LCD panel 100, and a phase-difference compensation portion 200 formed between the LCD panel 100 and the polarizing sheet 300b. The LCD panel 100 comprises a first substrate 110, a second substrate 130, and a first liquid crystal layer 150 formed between the first and second substrates 110 and 130.

The first substrate 110 includes a common electrode 160 and a pixel electrode 180 formed in parallel to form a transverse electric field with an insulating layer 170 interposed between the common electrode 160 and the pixel electrode 180. In this case, the common electrode 160 is formed in parallel to the pixel electrode 180, thereby forming a transverse electric field parallel to the first and second substrates 110 and 130. The common and pixel electrodes 160 and 180 of the present invention have variable structures consistent with those generally used in IPS mode LCD devices.

Although not shown, the first substrate 110 includes gate and data lines crossing each other to define a pixel region, and a thin film transistor (TFT) formed adjacent to a crossing of the gate and data lines. The second substrate 130 includes a black matrix layer to prevent light leakage, a color filter layer of red, green and blue patterns formed on the black matrix layer, and an overcoat layer formed on the color filter layer to planarize substantially an entire surface of the substrate.

Like the first exemplary embodiment of the present invention, the LCD device according to the second exemplary embodiment includes an alignment layer for an initial alignment of the first liquid crystal layer 150 which is formed on the first and second substrates 110 and 130. The first liquid crystal layer 150 generates a tilt angle (θ) of about 1°.

The polarizing sheets include the first polarizing sheet 300a formed on the outer surface of the first substrate 110, and the second polarizing sheet 300b formed on the outer surface of the second substrate 130. The first and second polarizing sheets 300a and 300b have respective transmission axes for transmitting polarized light at the predetermined orientation. In an IPS mode LCD device, the transmission axis of the first polarizing sheet 300a is perpendicular to the transmission axis of the second polarizing sheet 300b.

The phase-difference compensation portion 200 comprises a plurality of phase-difference films. In FIG. 5A, two phase-difference films 200a and 200b are shown. In FIG. 5B, three phase-difference films 200a, 200b and 200c are shown.

In the drawings, the phase-difference compensation portion 200 is provided between the LCD panel 100 and the second polarizing sheet 300b of the second substrate 130. However, the phase-difference compensation portion 200 may be provided between the LCD panel 100 and the first polarizing sheet 300a of the first substrate 110. The phase-difference films 200a, 200b and 200c include second liquid crystal layers 210a, 210b and 210c with different tilt angles from one another. Also, the sum total of a total tilt angle of the phase-difference compensation portion and a tilt angle of the first liquid crystal layer of the LCD panel corresponds to '0'.

The phase-difference compensation portion 200 is provided to realize a wide viewing angle of the LCD device and to solve a problem of asymmetry of black luminance caused by the liquid crystal layer in the LCD panel. A method for overcoming the problem of asymmetry of black luminance will be described as follows.

In the related art IPS mode, the tilt angle θ of the first liquid crystal layer in the LCD panel is about 1°. Accordingly, the black luminance asymmetrically generates due to the tilt angle of the first liquid crystal layer. However, in the LCD device according to the present invention, the total tilt angle of the phase-difference compensation portion is controlled to −1°, thereby solving the problem of asymmetry of black luminance. To obtain the total tilt angle of the phase-difference compensation portion of −1°, there is requirement for controlling the thickness of the second liquid crystal layers 210a, 210b and 210c having the different tilt angles from one another.

The phase-difference films 200a, 200b and 200c are fabricated according to the above-mentioned method. Also, the phase-difference films applied to the phase-difference compensation portion 200 are selected from the above-mentioned film types. As shown in FIG. 5A, two A-plate films 200a and 200b can be used. Also, two A-plate films 200a and 200b and one C-plate film 200c can be provided, as shown in FIG. 5B.

Figure 6A:
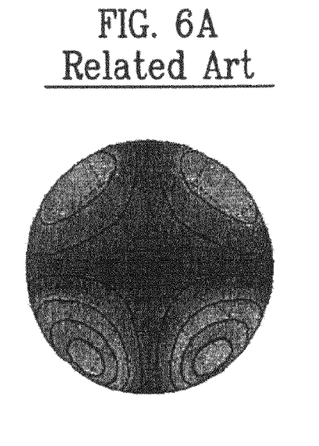
FIGS. 6A to 6C respectively illustrate a black luminance in a related art IPS mode LCD device, an IPS mode LCD device according to the exemplary embodiment of FIG. 5A, and an IPS mode LCD device of FIG. 5B according to the exemplary embodiment of FIG. 5B.
Figure 6B:
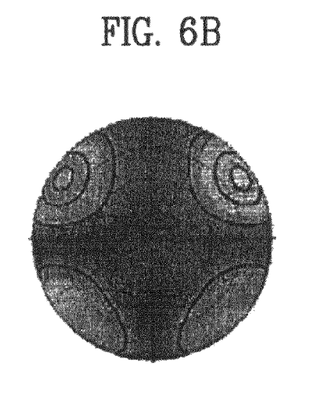
Figure 6C:
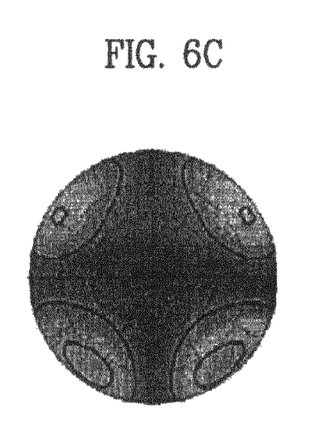

FIGS. 6A to 6C respectively illustrate the black luminance in the related art IPS mode LCD device, the IPS mode LCD device of FIG. 5A according to the present invention, and the IPS mode LCD device of FIG. 5B according to the present invention.

As compared with FIG. 6A of the related art IPS mode LCD device, FIGS. 6B and 6C of the IPS mode LCD devices according to the present invention, which applies the phase-difference films having the difference tilt angles, have greater symmetry with respect to black luminance. That is, the black luminance of the IPS mode LCD device according to the present invention using the phase-difference films of the different tilt angles is more symmetric than the black luminance of the IPS mode LCD device according to the related art.

As mentioned above, the LCD device according to the present invention has the following advantages. In the LCD device according to the present invention, the plurality of phase-difference films are provided to the phase-difference compensation portion. At this time, the phase-difference films have the different tilt angles of the liquid crystal layer, to thereby solve the problem of light leakage. In the IPS mode LCD device for driving the first liquid crystal layer by the transverse electric field, the problem of asymmetry of black luminance generated due to the tilt of the first liquid crystal layer of the LCD panel can be solved.

It will be apparent to those skilled in the art that various modifications and variations can be made in the liquid crystal display device of the present invention without departing from the spirit or scope of the invention. Thus, it is intended that the present invention cover the modifications and variations of this invention provided they come within the scope of the appended claims and their equivalents.

What is claimed is:

1. An in-plane switching (IPS) mode liquid crystal display (LCD) device using a phase-difference film, comprising:
   an LCD panel including a first substrate, a second substrate and a first liquid crystal layer between the first and second substrates, the first liquid crystal layer being driven by a transverse electric field between pixel and common electrodes on one of the first and second substrates of the LCD panel;
   first and second polarizing sheets positioned adjacent to the first and second substrates of the LCD panel respectively; and
   a first phase-difference compensation portion positioned between the first substrate of the LCD panel and the first polarizing sheet, the first phase-difference compensation portion including a plurality of phase-difference films having second, third, and fourth liquid crystal layers with tilt angles that are different from each other, wherein a sum total of a total tilt angle of the first phase-difference compensation portion and a tilt angle of the first liquid crystal layer of the LCD panel is zero;
   wherein the tilt angle of the first phase-difference compensation portion is controlled by adjusting the thickness of the second, third and fourth liquid crystal layers such that the sum total of the total tilt angle of the first phase-difference compensation portion and the tilt angle of the first liquid crystal layer of the LCD panel is zero; and
   wherein the tilt angle of the first liquid crystal layer of the LCD panel is 1°, and the total tilt angle of the first phase-difference compensation portion is −1°.

2. The IPS mode LCD device of claim 1, further comprising a second phase-difference compensation portion positioned between the second substrate of the LCD panel and the second polarizing sheet.

3. The IPS mode LCD device of claim 1, wherein the phase-difference films of the first phase-difference compensation portion include two A-plates and a C-plate.

4. The IPS mode LCD device of claim 1, wherein the plurality of phase-difference films of the first phase-difference compensation portion are formed by steps of:
   forming an alignment layer by coating an alignment material on a base film, baking the coated alignment material, and rubbing the baked alignment material; and
   coating a liquid crystal on the alignment layer, and curing the coated liquid crystal.

* * * * *